(12) United States Patent
Grether et al.

(10) Patent No.: US 7,093,797 B2
(45) Date of Patent: Aug. 22, 2006

(54) ADAPTABLE PAYLOAD APPARATUS AND METHODS

(75) Inventors: Martin R. Grether, Bothell, WA (US); Raymond R. Reed, Sammamish, WA (US); W. Forrest Frantz, North Bend, WA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 10/811,529

(22) Filed: Mar. 29, 2004

(65) Prior Publication Data

US 2005/0224648 A1    Oct. 13, 2005

(51) Int. Cl.
*B64C 1/20* (2006.01)

(52) U.S. Cl. .............................. 244/118.1; 244/118.6; 410/90

(58) Field of Classification Search ............ 244/117 R, 244/119, 118.1, 137.1, 137.3; 410/90
See application file for complete search history.

(56) References Cited

U.S. PATENT DOCUMENTS

| | | | |
|---|---|---|---|
| 2,579,003 A | 12/1951 | Josephian | |
| 2,876,969 A | 3/1959 | Tydon et al. | |
| 3,142,461 A | 7/1964 | Naylor | |
| 3,294,034 A | 12/1966 | Bodenheimer et al. | |
| 3,578,274 A | 5/1971 | Ginn et al. | |
| 3,904,064 A | 9/1975 | Looker | |
| 4,000,870 A | 1/1977 | Davies | |
| 4,479,621 A * | 10/1984 | Bergholz | 244/117 R |
| 4,483,499 A * | 11/1984 | Fronk | 244/118.1 |
| 4,875,645 A * | 10/1989 | Courter | 244/137.1 |
| 4,929,133 A | 5/1990 | Wiseman | |
| 5,090,639 A * | 2/1992 | Miller et al. | 244/118.1 |
| 5,322,244 A * | 6/1994 | Dallmann et al. | 244/118.5 |
| 5,752,673 A * | 5/1998 | Schliwa et al. | 244/118.6 |
| 6,302,358 B1 | 10/2001 | Emsters et al. | |
| 6,514,021 B1 * | 2/2003 | Delay | 410/90 |
| 6,554,225 B1 * | 4/2003 | Anast et al. | 244/117 R |
| 6,739,281 B1 | 5/2004 | Grimes | |

* cited by examiner

Primary Examiner—Galen Barefoot
(74) Attorney, Agent, or Firm—Lee & Hayes, PLLC

(57) ABSTRACT

Apparatus and methods for beaming some or all payload component loads out to surrounding support structure and adaptably coupling payload assemblies to a support structure are disclosed. In one embodiment, a payload assembly includes a payload member and at least one payload support. The payload member is adapted to be positioned proximate the support structure, and the at least one payload support is coupled to the payload member and is adapted to operatively engage at least one of the elongated supports of the support structure. The at least one payload support is further adapted to beam loads from the payload member to the at least one elongated support, and to be moveable with the payload member relative to the support structure. In one particular embodiment, the payload support includes an end portion adapted to engage with a top surface of the elongated support.

40 Claims, 8 Drawing Sheets

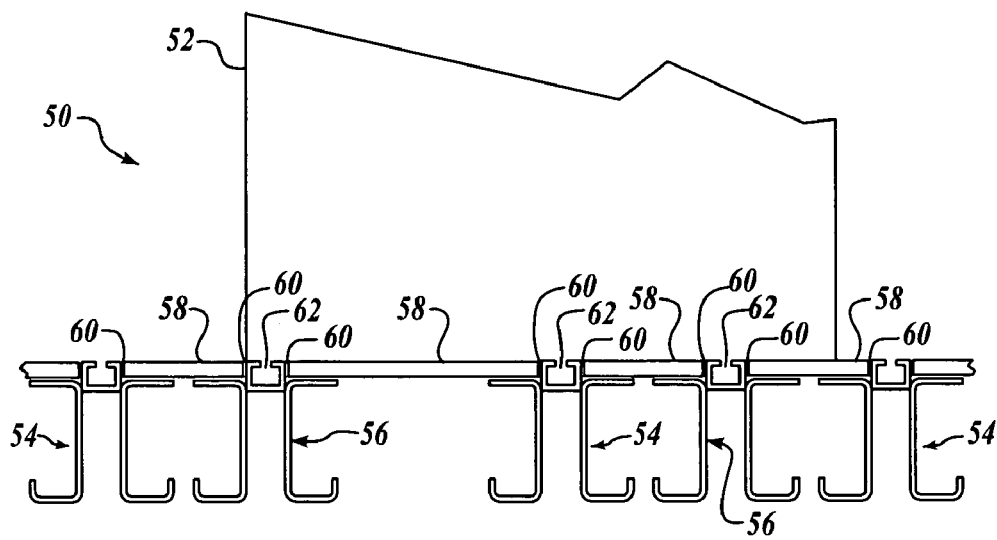
FIG.1 *(PRIOR ART)*
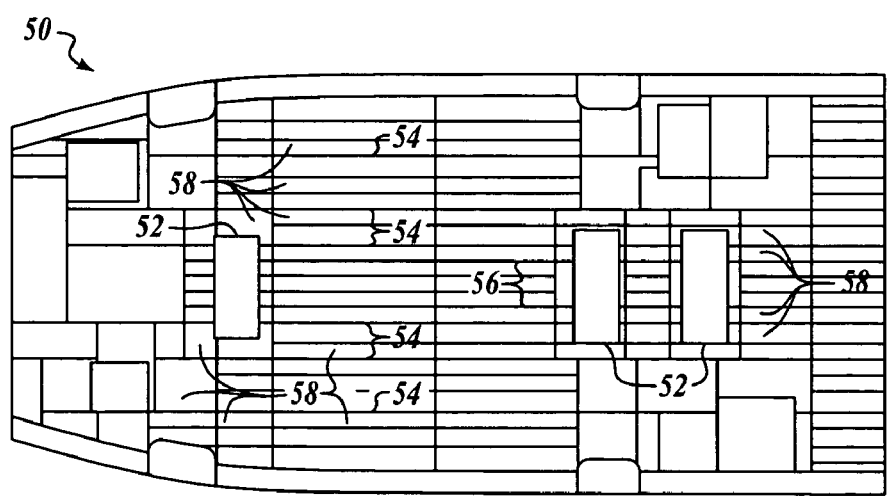
FIG.2 *(PRIOR ART)*

ADAPTABLE PAYLOAD APPARATUS AND METHODS

CROSS REFERENCE TO RELATED APPLICATIONS

This patent application is related to the following co-pending, commonly-owned U.S. patent applications filed concurrently herewith on Mar. 29, 2004, which applications are hereby incorporated by reference: U.S. patent application Ser. No. 10/811,528 entitled "Non-Protruding Seat Track Apparatus and Methods" U.S. patent application Ser. No. 10/811,771 entitled "Adaptable Payload Processes" U.S. patent application Ser. No. 10/811,522 entitled "Payload to Support Track Interface and Fitting Apparatus and Methods" and U.S. patent application Ser. No. 10/811,787 entitled "Adaptable Payload Enabling Architecture"

FIELD OF THE INVENTION

This invention relates generally to apparatus and methods for adaptably coupling payload assemblies to a support structure.

BACKGROUND OF THE INVENTION

Many aspects of modern commercial aircraft are manufactured in accordance with the particular requirements of the aircraft owner. One such aspect is the arrangement of the various components within the cabin of the aircraft, including the galleys, lavatories, passenger seats, cargo containers, section partitions, and other aircraft components. With conventional payload structure design, additional structure within the cabin of the aircraft is typically added as needed to account for larger than average loading caused by heavy monuments (e.g. lavatories, galleys, etc.) set between the floor and ceiling. When there is a need to move such monuments to different locations within the cabin of the aircraft, the floor, and potentially the walls and ceiling, need to be designed (or redesigned) to account for all potential monument locations.

For example, FIG. 1 is a side, partial cross-sectional view of a conventional support structure 50 and a payload assembly 52 in accordance with the prior art. FIG. 2 is a top elevational view of the conventional support structure 50 and payload assembly 52 of FIG. 1. The conventional support structure 50 includes a plurality of seat tracks 54 that extend longitudinally along the cabin of the aircraft. The seat tracks 54 are adapted to be coupled to a plurality of seat assemblies or other aircraft components, which may be positioned at desired locations along the seat tracks 54. Supplemental support members 56 are interspersed among the seat tracks 54 and extend beneath one or more of the payload assemblies 52 (FIG. 2). A plurality of floor panels 58 are disposed between the seat tracks 54 and the supplemental support members 56. At the edges of the floor panels 58, sealant is installed in the gap between the floor panel 58 edges and seat track 54 & 56 edges and sealing tape 60 (not shown), which is several inches wide, is installed over the sealed gap to minimize leakage between the floor panels 58 and the associated seat tracks 54 and supplemental support members 56. Finally, plugs 62 are installed in the unused, exposed portions of the seat tracks 54 and the supplemental support members 56 in some areas of the cabin.

As shown in FIGS. 1 and 2, the desired locations of the payload assemblies 52 (e.g. galleys, lavatories, etc) often do not lineup with the seat tracks 54, so that the supplemental support members 56 must be added to carry the loads. To move a payload assembly 52, such as a galley, to make room for changes in seating configuration or changes in layout, a lengthy series of tasks must typically be performed. For example, a galley area mat (not shown) must be removed. Next, payloads where the galley is going to be placed must also be removed (setting off another chain reaction of tasks). Sealing tape and sealant around where the initial position of the galley must be removed. Similarly, floor panels around the initial position of the galley must be removed. Sealing and sealing tape around the periphery of each of the floor panels must be removed, and the galley must be disconnected and moved out of the way. Next, old system interfaces must be removed and terminated (e.g. power, electronics, waste, air, heat, etc.), and new system interfaces that the new galley location must be designed, manufactured, and installed. The galley is then moved to the new location and installed, including connection of system interfaces, manufacture and installation of new floor panels, installation of sealant between the floor panels, installation of sealing tape over all floor panel edges, and installation of a new galley mat.

Although desirable results have been achieved using the conventional support structure 50 and payload assembly 52, there is room for improvement. For example, the supplemental support members 54 are typically added over the entire portion of the aircraft cabin known as the flex-zone in which the payload assemblies 52 may be desirably located so that they will not need to be added later when a move is desired. Unfortunately, this practice increases manufacturing costs, and also adds unnecessary weight to the aircraft which increases operational costs. Therefore, novel support structures and payload assemblies which at least partially mitigate these characteristics would be useful.

SUMMARY OF THE INVENTION

The present invention is directed to apparatus and methods for beaming some or all payload component loads out to surrounding support structure and adaptably coupling payload assemblies to a support structure. Embodiments of apparatus and methods in accordance with the present invention may advantageously reduce the weight of the support structure, and may reduce the labor and expense associated with manufacturing, maintaining, and modifying the support structure and the payload assembly in comparison with the prior art.

In one embodiment, a payload assembly adapted to be secured to a support structure having a plurality of elongated, spaced apart supports includes a payload member and at least one payload support. The payload member is adapted to be positioned proximate the support structure, and the at least one payload support is coupled to the payload member and is adapted to operatively engage at least one of the elongated supports of the support structure. The at least one payload support is further adapted to carry loads from the payload member to the at least one elongated support and adapted to be moveable with the payload member relative to the support structure. In one particular embodiment, the payload support includes an end portion that is adapted to engage with a top surface of the at least one elongated support. Alternately, the payload support is adapted to span between an adjacent pair of elongated supports, the end portions of the payload support being adapted to engage the top surface of each of the adjacent elongated supports.

BRIEF DESCRIPTION OF THE DRAWINGS

The preferred and alternative embodiments of the present invention are described in detail below with reference to the following drawings.

FIG. 1 is a side, partial cross-sectional view of a floor support structure and payload assembly in accordance with the prior art;

FIG. 2 is a top elevational view of a conventional floor support structure and payload assembly of FIG. 1 in accordance with the prior art;

DETAILED DESCRIPTION

The present invention relates to apparatus and methods for beaming some or all payload component loads out to surrounding support structure and adaptably coupling payload assemblies to a support structure. Many specific details of certain embodiments of the invention are set forth in the following description and in FIGS. 3–17 to provide a thorough understanding of such embodiments. One skilled in the art, however, will understand that the present invention may have additional embodiments, or that the present invention may be practiced without several of the details described in the following description.

Generally, adaptable payload apparatus and methods in accordance with the present invention may advantageously allow payloads to be positioned and repositioned with greater flexibility, and with reduced labor and expense, in comparison with the prior art. In one embodiment, a payload assembly includes a primary payload component, a payload support that carries the load from the payload assembly to the surrounding basic and stable support structure, a payload fastening system that couples the payload support to the primary payload component, and a support fastening system that couples the payload support to the surrounding basic and stable support structure. With conventional payload apparatus, the payload support, the payload fastening system, and the support fastening system are typically part of the support structure. In accordance with the present invention, however, the payload support, a payload fastening system, and a support fastening system may be part of the adaptable payload assembly and can move with the adaptable payload assembly to a desired new location. Thus, as described more fully below, significant advantages in weight and economy associated with the adaptable payload assembly may be achieved.

Figure 3:
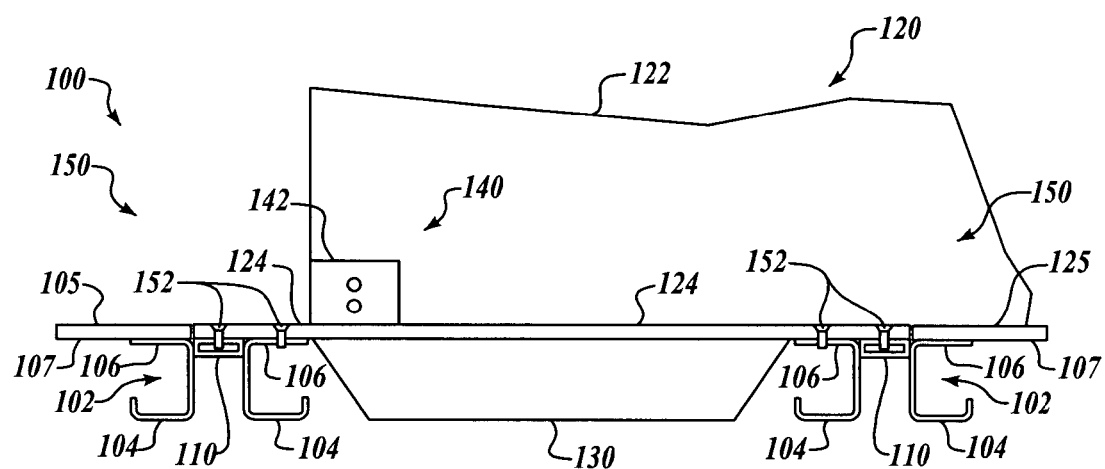
FIG. 3 is a side, partial cross-sectional view of a floor support structure and an adaptable payload assembly in accordance with an embodiment of the invention.
Figure 4:
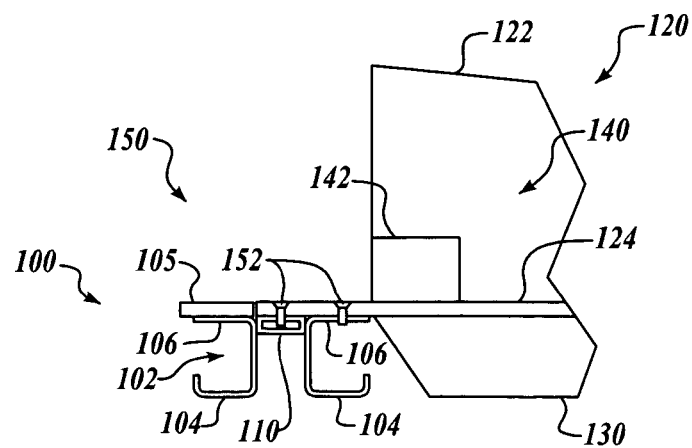
FIG. 4 is an enlarged, partial cross-sectional view of the floor support structure and adaptable payload assembly of FIG. 3.

FIG. 3 is a side, partial cross-sectional view of a support structure 100 and an adaptable payload assembly 120 in accordance with an embodiment of the present invention. FIG. 4 is an enlarged, partial cross-sectional view of the support structure 100 and adaptable payload assembly 120 of FIG. 3. In this embodiment, the support structure 100 includes a plurality of floor panels 105, and a plurality of elongated floor supports 102 disposed beneath the floor panels 105 and extending longitudinally along the cabin of the aircraft. The floor supports 102 represent the basic and stable floor structure that supports the payload assembly 120.

Each of the floor supports 102 engages a lower surface of one or more of the floor panels 105, as described more fully in co-pending, commonly-owned U.S. patent application Ser. No. 10/811,528 entitled "Non-Protruding Seat Track Apparatus and Methods", filed concurrently herewith on Mar. 29, 2004 and previously incorporated herein by reference. In brief, in this embodiment, each floor support 102 includes a pair of structural members 104 (in this case "C"-shaped members) having upper surfaces 106 that engage against the lower surfaces 107 of the floor panels 105. An engagement member 110 is coupled to the structural members 104 and has an upper, engagement surface that is adapted to be coupled to the payload assembly 120. The floor supports 102 are situated significantly below the top surface of the floor panels 105 (and do not protrude above the top surface). It will be appreciated that the floor supports 102 may engage the lower surfaces 107 of the floor panels 105 directly or indirectly, as a variety of materials or components may be disposed between the upper surfaces 106 and the floor panels 105, including, for example, an insert spacer, a clip-nut, cork, tape, or other materials or components.

As further shown in FIG. 3, the payload assembly 120 includes a primary component 122 coupled to a top chord of a payload support panel 124 using one or more payload fastening assemblies 140. The payload support top chord 124 can be a structured floor panel (e.g. a composite or metal material) designed to transmit the load of the primary component 122. A non-supporting payload panel 125 is positioned adjacent the support panel 124 and is used where beaming loads from the primary component 122 is not necessary. In this embodiment, the payload fastening assembly 140 includes a monument 142 that projects upwardly from the top chord of the payload support panel 124 and that is coupled to the top chord of the payload support panel 124 and to the primary component 122 using, for example, bolts, screws, adhesives, or any other suitable fastening devices. An intercostal 130 is coupled to the top chord of the payload support panel 124 and is transversely disposed between a pair of adjacent floor supports 102. In a particular embodiment, the intercostal 130 is integrally-formed with the top chord of the payload support panel 124 and payload panel.

A plurality of support attachment assemblies 150 couple the payload support panel 124 to the floor supports 102. In this embodiment, each support attachment assembly 150 includes threaded fasteners 152 disposed through the payload support panel 124 and threadedly engaged with the engagement member 110 and a respective one of the upper surfaces 106 of the floor support 102. In this way, the loads applied to the intercostal 130 are transferred through the payload support panel 124 and the support attachment assemblies 150 to the top of the floor supports 102 (e.g. to the engagement member 110 and the upper surface 106). In one particular embodiment, the engagement member 110 has a standard hole pattern disposed therein that mates with a standard hole pattern on the top chord of the payload support panel 124 and non-supporting payload panel 125 for wherever the payload assembly 120 may be located on the engagement member 110.

It will be appreciated that the primary component 122 may be, for example, a galley, a lavatory, a passenger seat, a cargo container, a section partition, a fireplace, shelving, a bed or other article of furniture, or any other component that may be located within the aircraft (or other vehicle or structure). For example, embodiments of the present invention may be used to secure dividing devices (or partitions) within the passenger cabin of an aircraft, as generally disclosed, for example, in U.S. Pat. No. 5,393,013 issued to Schneider et al., and to secure cargo containers as generally disclosed, for example, in U.S. Pat. No. 5,090,639 issued to Miller et al. It will also be appreciated that the payload attachment assembly 140 is not limited to the particular embodiment shown in FIGS. 3 and 4, but rather, may include fasteners, fixtures, adhesive, welds, are any other suitable attachment method.

In operation, the payload assembly 120 is moved from a first position to a second position by decoupling the support attachment assemblies 150 from the floor supports 102, and then moving the payload assembly 120 to the desired second position. The support attachment assemblies 150 are then re-coupled to the floor supports 102. The edges of the panels 124, 125 are then sealed (e.g. using calking, sealing tape, etc.).

Embodiments of the adaptable payload assemblies in accordance with the present invention may provide significant advantages in comparison with the prior art. For example, because the intercostal 130 is adapted to transferred loads to the surrounding floor supports 102, the number floor supports 102 needed to support the payload assembly 120 may be reduced, and the auxiliary supports 56 (FIG. 1) may be eliminated. Also, since the intercostal 130 is coupled to the payload support panel 124 and moves with the payload assembly 120, the need to install floor supports 102 (and auxiliary supports 56) in all places within the flex-zone of the passenger cabin to accommodate possible locations of the payload assembly 120 is reduced. This may result in reduced labor and expense associated with manufacturing and installation of the support structure 100, and may reduce the weight of the support structure that must be carried aboard the aircraft. The reduction in weight may advantageously result in reduced operating costs. Overall, embodiments of adaptable payload assemblies that include a payload fastening system, the payload support, and a support fastening system that move with the payload assembly can provide significant advantages in weight, design, manufacture, and installation of because duplication of the structures is reduced or eliminated when the payload assembly is repositioned on the support structure.

It will be appreciated that the payload support may assume a variety of alternate embodiments suitable for providing support for the primary payload component and for transferring the loads of the payload assembly to the surrounding basic and stable support structure. For example, the payload support may be a sandwich panel, a metal panel, or composite structure. If the payload panel is a sandwich panel or laminate structure, each scan can be metal or composite material, or a combination of both, and the core can be a composite or metal material. In addition, the payload support can use inserts or embedded hard points as part of fastening system to help transferred loads to attachment points. Stiffeners can also be embedded into sandwich panels where loads need to be carried. The payload support may be of constant thickness or variable thickness (e.g. being thicker at the locations where higher load moments exist).

Figure 5:
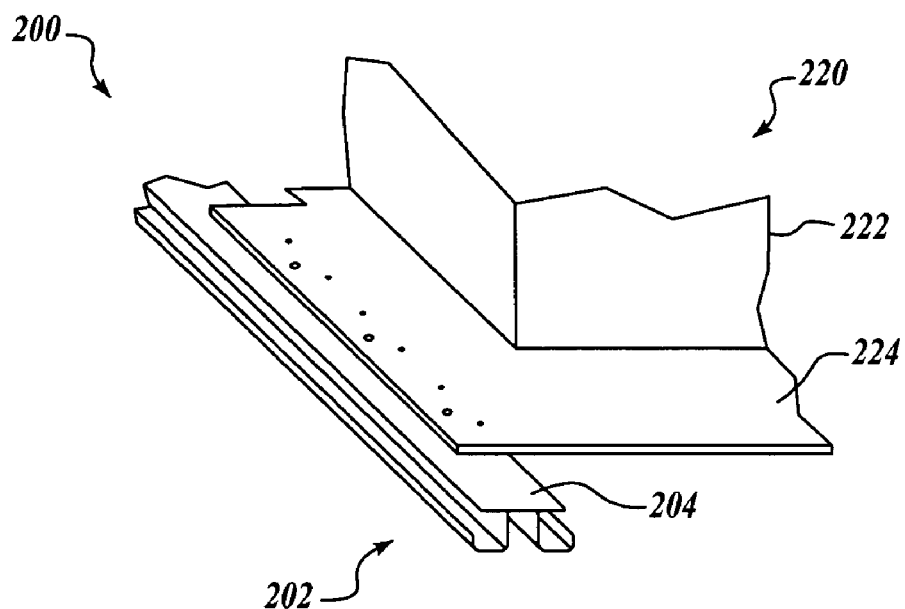
FIG. 5 is an isometric view of an adaptable payload assembly and an engagement member in accordance with another embodiment of the invention.
Figure 6:
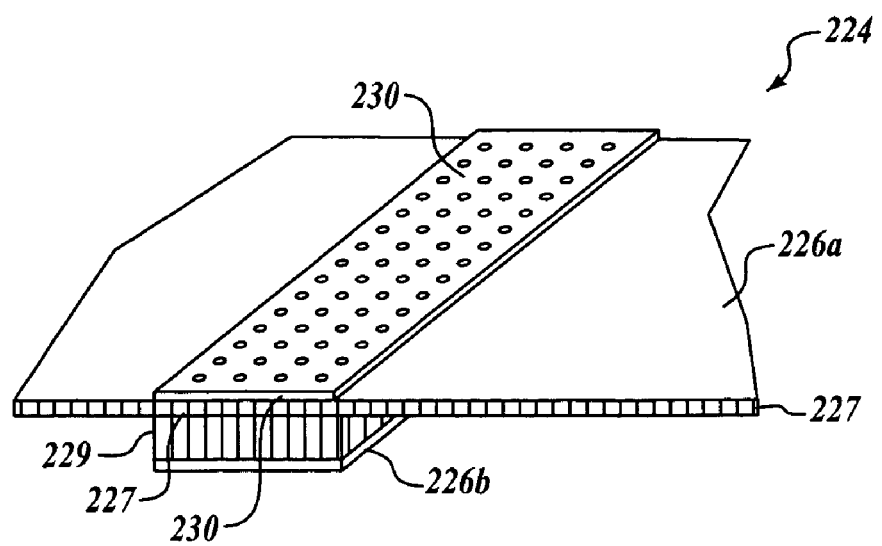
FIG. 6 is an isometric, partial cross-sectional view of a payload panel and structured payload panel support in accordance with an alternate embodiment of the invention.

For example, FIG. 5 is an isometric view of an adaptable payload assembly 220 and an engagement member 204 of a floor support 202 in accordance with another embodiment of the invention. This embodiment can be used when payload peak loads are small enough to be carried by a sandwich panel. FIG. 6 is an enlarged isometric, partial cross-sectional view of one variant of the sandwich panel 224 of FIG. 5 showing that the floor panel does not have to be of a constant thickness when loads are higher and payload supports are integrated into the sandwich panel 224. In this variant of the embodiment, the adaptable payload assembly 220 includes a payload panel 224 that is a composite sandwich panel. As shown in FIG. 6, the sandwich panel 224 includes a payload panel and payload support where the first outer carbon layer 226a disposed on a first titanium core 228, and an inner titanium layer 227 adjacent the first titanium core 228. A relatively-thicker titanium support core 229 is coupled to the inner titanium layer 227, and a second outer carbon layer 226b is formed on the titanium support core 229. A titanium member 230 is coupled to one of the outer carbon layers 226 for stiffening and strengthening the payload panel 224. The payload panel 224 transfers loads from the payload assembly 220 (e.g. from the primary component 222) to the surrounding basic and stable structure (e.g. the floor support 202). In alternate embodiments, the core 228 may be formed of other metals, paper, or any other suitable materials, and that the outer layers 226 may be formed of carbon, metal, class, a combination of these materials, or any other suitable materials.

Figure 7:
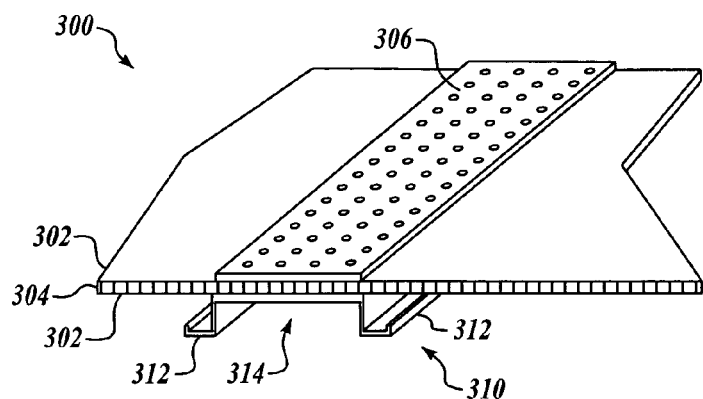
FIG. 7 is an isometric, partial cross-sectional view of a payload panel and structure payload support in accordance with another alternate embodiment of the invention.

FIG. 7 is an isometric, partial cross-sectional view of a payload panel and support 300 in accordance with another alternate embodiment of the invention that typically would be used to carry higher loads than a sandwich panel. The payload panel 300 includes outer carbon layers 302 disposed on a titanium core 304. A titanium stiffener 306 is coupled to an upper one of the outer carbon layers 302, and a payload support 310 is coupled to a lower one of the outer carbon layers 302 opposite from the stiffener 306. In this embodiment, the payload support 310 has a generally "top hat" cross-sectional shape with a pair of outwardly-depending flange portions 312 and a centrally-disposed raised (or plateau) portion 314 that is coupled to the lower carbon layer 302.

The payload panel embodiments shown in FIGS. 6 and 7 may provide the above noted advantages of reduced weight and improved economy, and may increase the adaptability of the payload panel. Because the payload support members (i.e. the titanium stiffeners and core) have a smaller cross-sectional profile compared with alternate embodiments (e.g. the intercostal 130 of FIG. 3), these alternate embodiments of payload panels may be used in areas having less clearance. It will be appreciated, however, that in alternate embodiments, the payload support panel 124 shown in FIG. 3 could be altered to have a fairly stiff upper chord that might allow such alternate embodiment to have a thinner profile than the embodiments shown in FIGS. 6 and 7.

It will be appreciated that a variety of embodiments of intercostals may be conceived in accordance with the teachings of the present disclosure. For example, the intercostal, one type of payload support, can be used alone or in conjunction with the payload panel to provide additional load-carrying capability for the payload panel. The intercostal may be designed with features (e.g. joggles, etc.) to maintain a flush relationship between the payload panel and the surrounding floor panels. Also, the intercostal can be made from a composite or metal material, and can use inserts or embedded hard points as part of that fastening system to help transfer loads to attachment points on the floor supports. Intercostals in accordance with the present invention can have a constant or variable thickness (e.g. being thicker at the locations where higher load moments exist). Also, and intercostal can include a "top hat"-shaped cross-section, and "I"-shaped cross-section, and "J"-shaped cross-section, a "C"-shaped cross-section, are any other suitable type of cross-section are combination of cross-sections to beam the loads from the payload fastening system to the support fastening system.

Figure 8:
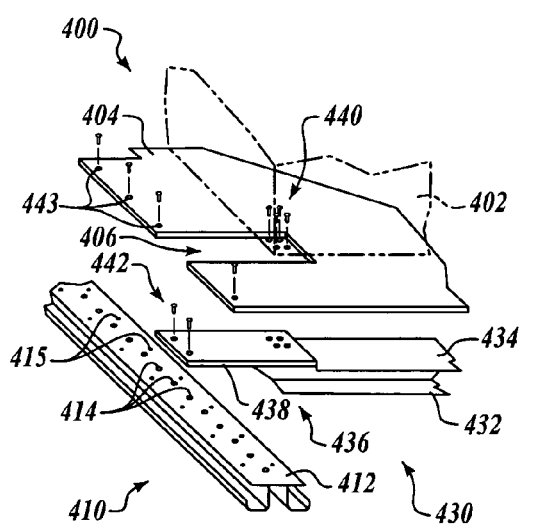
FIG. 8 is a partially-exploded isometric view of an adaptable payload assembly in accordance with another embodiment of the invention.
Figure 9:
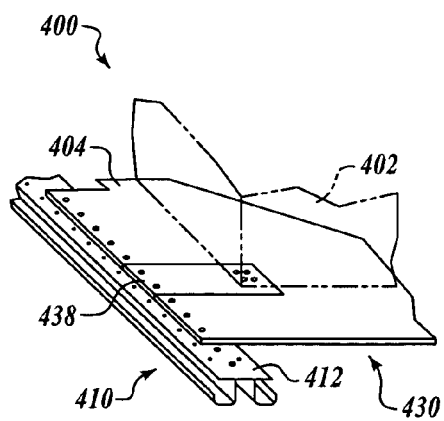
FIG. 9 is an isometric, assembled view of the adaptable payload assembly of FIG. 8.

FIG. 8 is a partially-exploded isometric view of an adaptable payload assembly 400 in accordance with another embodiment of the invention. FIG. 9 is an isometric, assembled view of the adaptable payload assembly 400 of FIG. 8. In this embodiment, the adaptable payload assembly 400 includes a primary payload component 402 and a payload panel 404. A support recess 406 is disposed in the payload panel 404. An elongated support member 410 includes an engagement surface 412 that is positioned below and disposed along an edge of the payload panel 404. A plurality of coupling apertures 414 are disposed in the engagement surface 412.

As best shown in FIG. 8, a payload support 430 includes a beam 432 (in this case, an "I"-shaped beam) having an upper surface 434 that engages against a lower surface of the payload panel 404. An end portion 436 of the beam 432 includes an attachment plate 438. During assembly, the attachment plate 438 is positioned partially over the engagement surface 412 of the support member 410, and is fittingly-engaged into the support recess 406 of the payload panel 404. A plurality of first fasteners 440 are disposed through the primary payload component 402 and into the attachment plate 438 of the beam 432. A plurality of second fasteners 442 are disposed through the attachment plate 438 and into the engagement apertures 414 of the engagement surface 412 of the support member 410, and a plurality of third fasteners 443 are disposed through the payload panel 404 into the engagement apertures 415 of the engagement surface 412 of the support member 410 thereby securing the adaptable payload assembly 400 to the support member 410.

Figure 10:
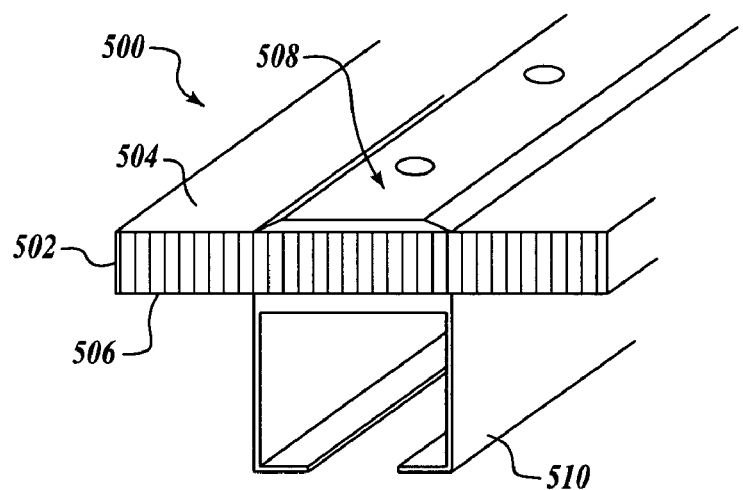
FIG. 10 is an isometric view of a payload panel and integrated payload support in accordance with yet another embodiment of the invention.

FIG. 10 is an isometric view of a payload panel assembly 500 in accordance with yet another embodiment of the invention. In this embodiment, the payload panel assembly 500 includes a composite core 502, and upper and lower surfaces 504, 506 coupled thereto. It will be appreciated that the composite core 502 may be formed by a process that includes a forging or molding step wherein plastic or metal is formed into the composite core 502. A stiffener 508 is coupled to the upper surface 504, and a payload support 510 is coupled to the lower surface 506. In this embodiment, the payload support 510 includes a substantially enclosed (or "box") beam member.

Figure 11:
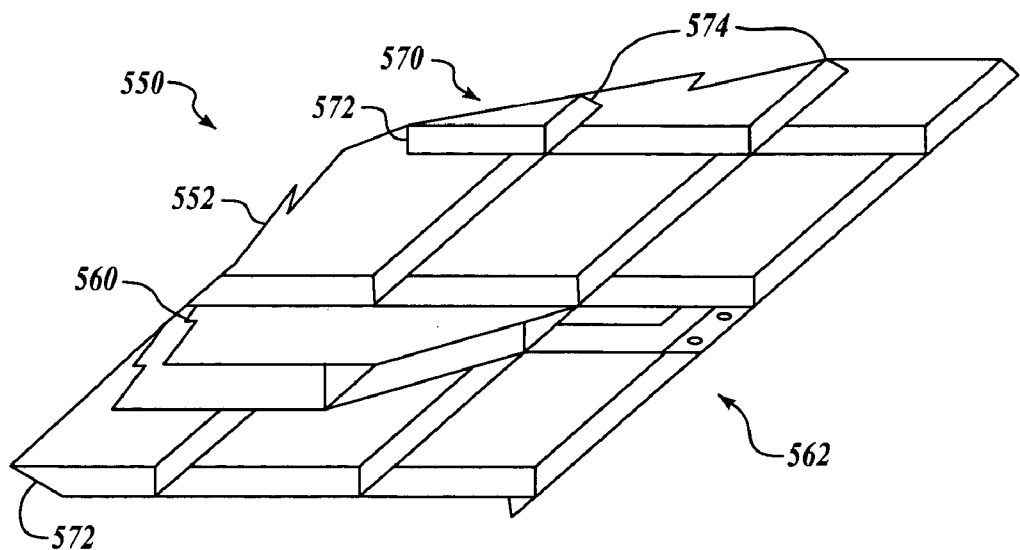
FIG. 11 is a lower isometric view of an adaptable payload assembly in accordance with another embodiment of the invention.

FIG. 11 is a lower isometric view of an adaptable payload assembly 550 in accordance with another embodiment of the invention. The adaptable payload assembly 550 includes a payload panel 552, and a payload support 560 integrally formed with a lower surface of the payload panel 552. The payload support 560 has an end portion 562 that is adapted to be coupled to surrounding basic and stable support structure (e.g. an engagement member of a floor support). A support grid 570 having a plurality of transverse members 572 and a plurality of longitudinal members 574 is also formed on the lower surface of the payload panel 552. In this embodiment, one of the longitudinal members 574 is disposed along an edge of the payload panel 552 and is adapted to engage with the surrounding basic and stable support structure. Thus, the loads associated with the primary payload component (not shown) may be transferred to the surrounding basic and stable support structure through combination of the payload support 560 and the support grid 570.

Figure 12:
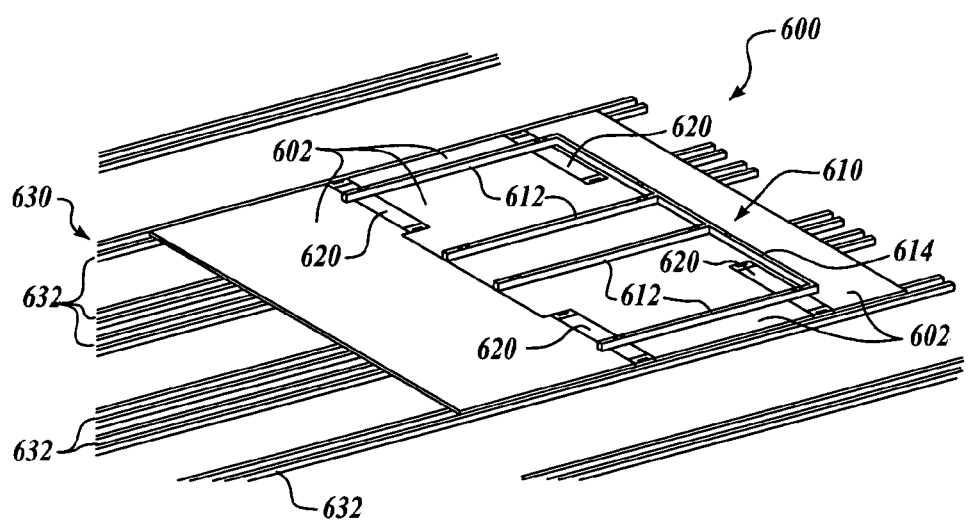
FIG. 12 is an upper isometric view of an adaptable payload assembly in accordance with another yet another embodiment of the invention.
Figure 13:
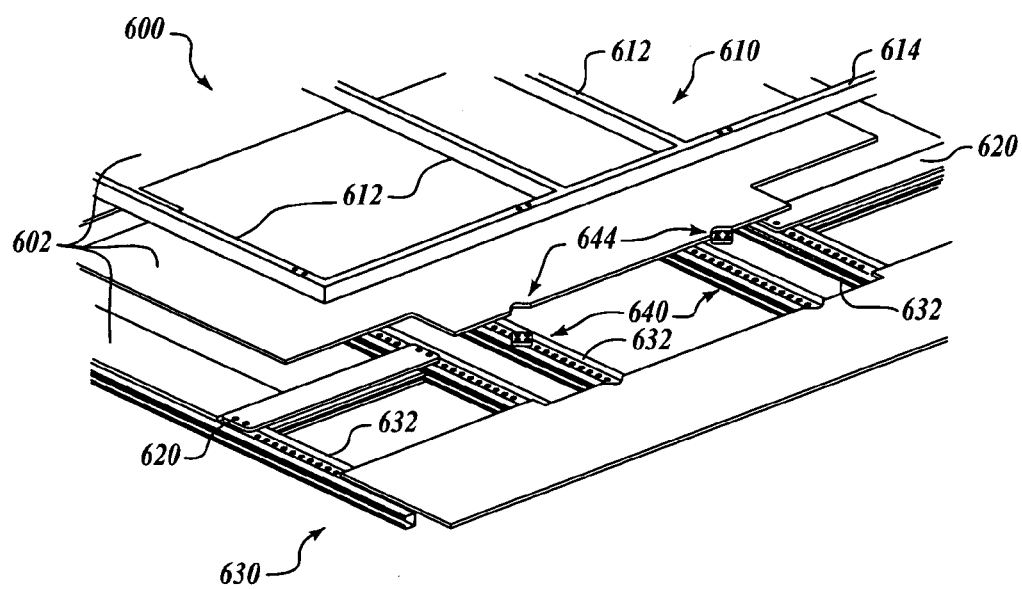
FIG. 13 is an enlarged, partially-exploded upper isometric view of the adaptable payload assembly of FIG. 12.
Figure 14:
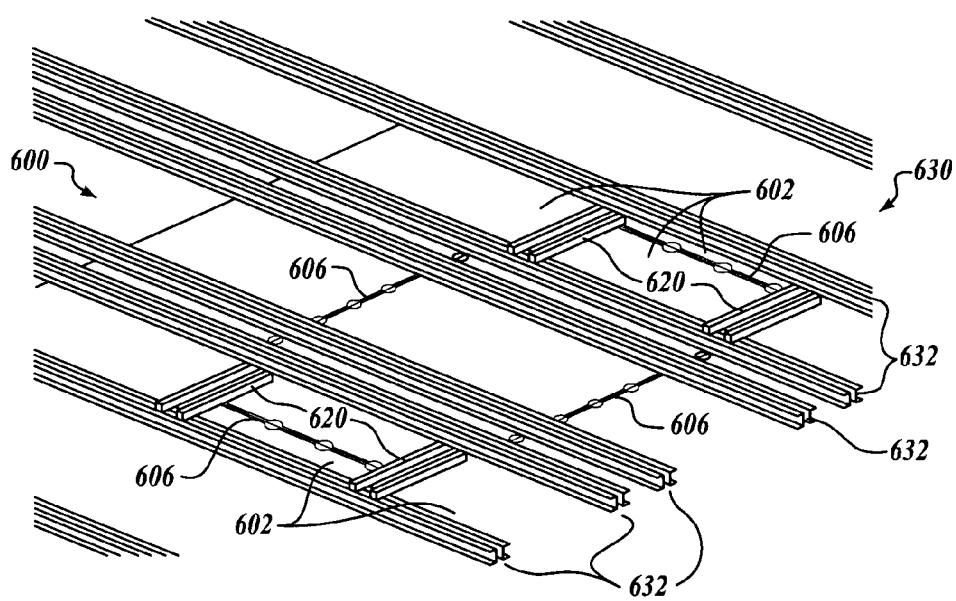
FIG. 14 is a lower isometric view of the adaptable payload assembly of FIG. 12.
Figure 15:
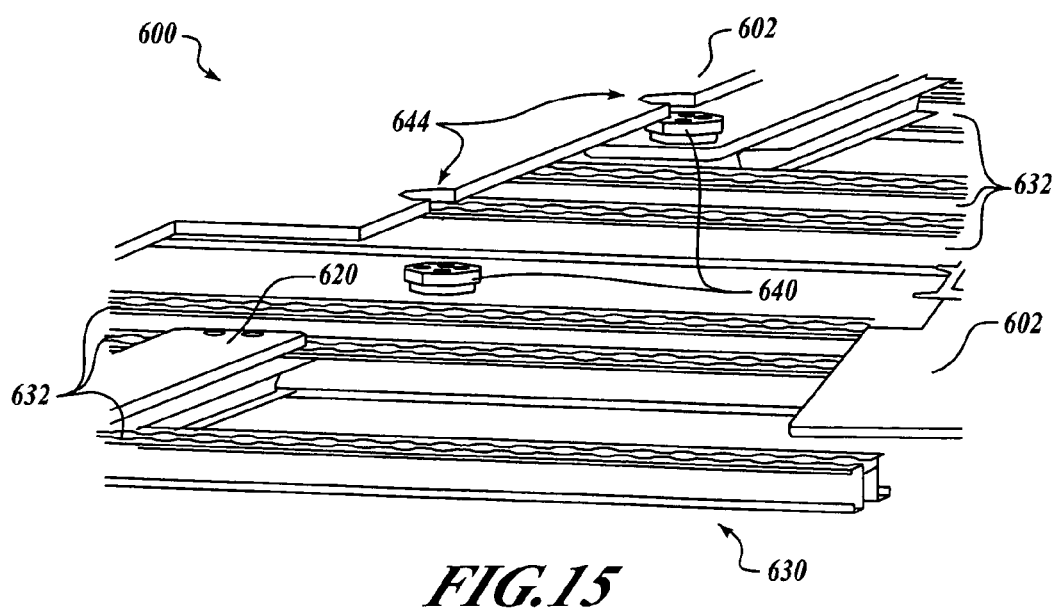
FIG. 15 is another enlarged, partially-exploded upper isometric view of the adaptable payload assembly of FIG. 12.

FIG. 12 is an upper isometric view of an adaptable payload assembly 600 in accordance with another yet another embodiment of the invention. FIGS. 13 and 15 are enlarged, partially-exploded upper isometric views of the adaptable payload assembly 600 of FIG. 12. FIG. 14 is a lower isometric view of the adaptable payload assembly 600 of FIG. 12. In this embodiment, the adaptable payload assembly 600 includes a plurality of payload panels 602. A payload attachment assembly 610 is attached to the payload panels 602 and includes a framework of elongated longitudinal and transverse monuments 612, 614. The longitudinal and transverse monuments 612, 614 project upwardly from the payload panels 602 and are adapted to be coupled to a primary payload component (see FIG. 3). As shown in FIG. 14, abutting edges of adjacent payload panels 602 may be attached using elongated splice plates 606.

A plurality of payload supports (or intercostals) 620 are coupled to the outermost longitudinal monuments 612, and span between adjacent support members 632 of a floor assembly 630. The elongated support members (or seat tracks) 632 are the basic and stable structure of the floor assembly 630 that supports the adaptable payload assembly 600. As best shown in FIG. 12, each of the payload supports 620 includes an upper portion that fittingly engages with adjacent payload panels 602 (or adjacent floor panels), and is approximately coplanar with the adjacent payload panels 602. The end portions of each payload support 620 are coupled to a top surface of each of the adjacent support members 632 (FIG. 13). Finally, as shown in FIGS. 13 and 15, a plurality of interface assemblies 640 (two shown) are coupled to the elongated support members 632. An upper portion of each interface assembly 640 engages into a recess 644 disposed in an edge of the adjacent payload panel 602.

In operation, the adaptable payload assembly such as 600 may be used to support any desired primary payload component (e.g. a galley, a cargo container, a lavatory, a passenger seat, a crew seat, a section partition, a fireplace, shelving, a bed or other article of furniture, etc.). With the primary payload component coupled to the payload attachment assembly 610, the loads associated with the primary payload component are partially carried through the longitudinal monuments 612 directly to support members 632 located directly underneath the attachment assembly 610 and are partially carried through the outermost longitudinal monuments 612 to the payload supports 620. In turn, the payload supports 620 beam the loads to the adjacent support members 632. The interface assemblies 640 engage the edges of the correspondingly adjacent payload panels 602 and further secure the adaptable payload assembly 600 to the floor assembly 630. To move the payload assembly 600, the end portions of the payload supports 620 are decoupled from the associated support members 632, and the adaptable payload assembly 600 (including the payload supports 620) is then lifted and moved to the desired new location on the floor assembly 630.

Figure 16:
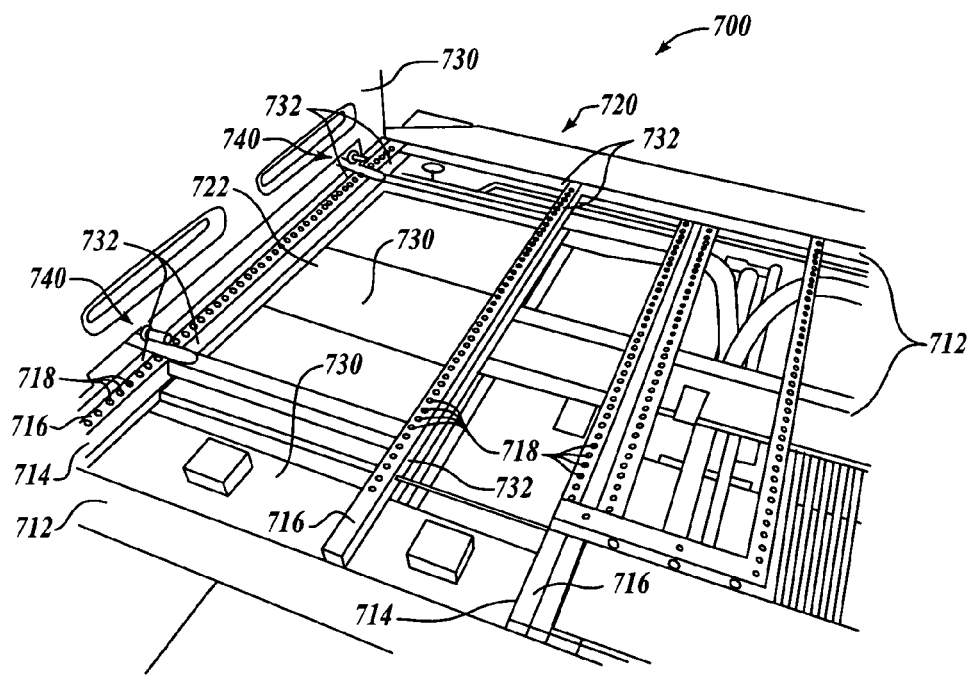
FIG. 16 is an upper isometric view of a portion of an aircraft passenger cabin including an adaptable payload assembly in accordance with an embodiment of the invention.

FIG. 16 is an upper isometric view of a portion of an aircraft passenger cabin 700 including in accordance with an embodiment of the invention. In this alternate embodiment, the cabin 700 includes a floor assembly 710, an adaptable payload assembly 720, and a fuselage portion 730 which forms an outer wall of the cabin portion 700. The floor assembly 710 includes a plurality of transverse main beams 712 representing a portion of an airframe. A plurality of elongated floor supports 714 are disposed over the main beams 712 and are longitudinally aligned within the cabin portion 700. Each elongated floor support 714 includes an upper engagement surface 716 having a plurality of coupling apertures 718 disposed therein.

In this embodiment, the adaptable payload assembly 720 includes a payload panel 722 that extends between an adjacent pair of floor supports 714. A pair of payload supports 730 are engaged against a lower surface of the payload panel 722 and transversely extend between the adjacent pair of floor supports 714. More specifically, the end portions of each of the payload supports 730 include a flattened, plate-like member that projects over the engagement surface 716 of each of the adjacent floor supports 714. A pair of payload attachment monuments 740 proposition of the payload panel 722 over the payload supports 730. The payload attachment monuments 740 are adapted to be coupled to a primary payload component (not shown). Fasteners 732 are disposed through the payload panel 722, through the end portions of the payload supports 730 (and, if necessary, through the payload attachment monuments 740), and are engaged with the coupling apertures 718 of the floor supports 714. In the embodiment shown in FIG. 16, the payload panel 722 is a substantially transparent panel to allow viewing of the payload supports 730 (e.g. for demonstration purposes). In operation, the payload supports 730 and the payload attachment monuments 740 are coupled to the payload panel 722 and are moveable with the payload panel 722 to a desired new location on the floor assembly 710.

Figure 17:
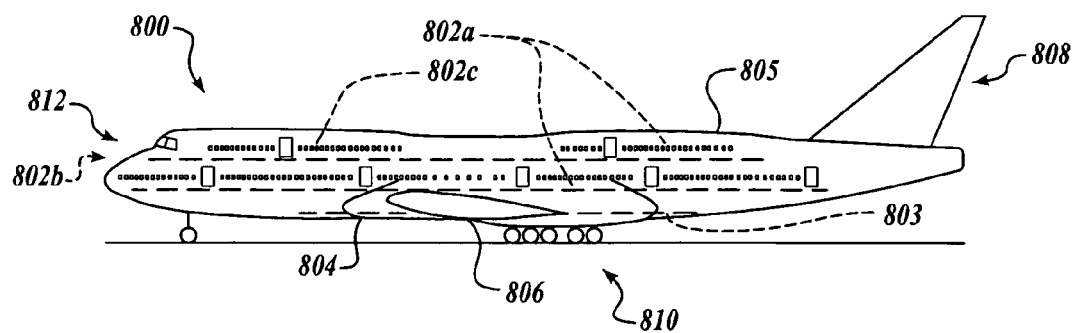
FIG. 17 is a side elevational view of an aircraft in accordance with yet another embodiment of the invention.

As noted above, embodiments of the present invention may be used in a wide variety of applications, including aircraft, ships, trains, buildings, or any other suitable application. For example, FIG. 17 is a side elevational view of an aircraft 800 in accordance with another alternate embodiment of the present invention. In general, except for one or more assemblies 802 in accordance with the present invention, the various components and subsystems of the aircraft 800 may be of known construction and, for the sake of brevity, will not be described in detail herein. Embodiments of assemblies 802 for situating and securing payloads to support structures in accordance with the present invention may be employed in one or more desired locations throughout the aircraft 800.

More specifically, as shown in FIG. 17, the aircraft 800 includes one or more propulsion units 804 coupled to an airframe 803 (not visible) disposed within a fuselage 805, wing assemblies 806 (or other lifting surfaces), a tail assembly 808, a landing assembly 810, a control system 812 (not visible), and a host of other systems and subsystems that enable proper operation of the aircraft 800. The assemblies 800 for situating and securing payloads to support structures in accordance with the present invention are distributed throughout the various portions of the aircraft 800, including, for example, within the cockpit (802b), the first-class section (802c), and the coach or business class section (802a).

Although the aircraft 800 shown in FIG. 17 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in virtually any other types of aircraft. More specifically, the teachings of the present invention may be applied to other types and models of passenger aircraft and military aircraft, and any other types of aircraft, including those described, for example, in The Illustrated Encyclopedia of Military Aircraft by Enzo Angelucci, published by Book Sales Publishers, Sept. 2001, and in Jane's All the World's Aircraft published by Jane's Information Group of Coulsdon, Surrey, United Kingdom, which texts are incorporated herein by reference. Furthermore, alternate embodiments of apparatus and methods in accordance with the present invention may be used in the other applications, including, for example, ships, buses, trains, recreational vehicles, subways, monorails, houses, apartments, office buildings, or any other desired application.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. A payload assembly adapted to be secured to a support structure having a plurality of elongated, spaced apart supports, comprising:

a payload member having a substantially flat portion adapted to be positioned proximate the support structure, the substantially flat portion having a lateral edge that includes a recess;

at least one payload support coupled to the substantially flat portion and adapted to span between an adjacent pair of elongated supports of the support structure, the at least one payload support having first and second end portions that are adapted to engage with a top surface of each of the adjacent pair of elongated supports, the first end portion of the payload support including an offset flat portion, the lateral edge of the substantially flat portion being substantially parallel with and adjacent to a corresponding one of the elongated supports such that the offset flat portion is fittingly engaged within the recess and is substantially co-planar with the substantially flat portion, the at least one payload support being adapted to beam loads from the payload member to the adjacent pair of elongated supports, the at least one payload support further being adapted to be disengagable from the adjacent pair of elongated supports and moveable with the payload member relative to the support structure.

2. The payload assembly of claim 1, wherein the offset flat portion includes a plate member that is adapted to project over the top surface.

3. The payload assembly of claim 1, wherein the payload member includes a primary payload component coupled to the at least one payload support, the primary payload component including at least one of a galley, a lavatory, a passenger seat, an attendant seat, a cargo container, a section partition, a fireplace, a shelf, and an article of furniture.

4. The payload assembly of claim 1, wherein the payload member includes a payload panel coupled to an upper surface of the at least one payload support.

5. The payload assembly of claim 4, wherein the payload panel includes at least one recess disposed within a peripheral edge thereof, the at least one-payload support having an upper portion that is fittingly engaged into the at least one recess.

6. The payload assembly of claim 4, wherein the at least one payload support is coupled to a lower surface of the payload panel, the at least one payload support including at least one of a substantially flat stiffener, an "I" beam member, a "top hat"-shaped beam member, a "J" beam member, a "C"-shaped beam member, and a "box" beam member.

7. The payload assembly of claim 4, wherein the payload panel comprises at least one of a metal panel, a composite panel, a sandwich panel, and a laminate panel.

8. The payload assembly of claim 4, wherein the at least one payload support is integrally-formed with the payload panel.

9. The payload assembly of claim 4, wherein the at least one payload support includes a framework having one or more longitudinal members and one or more transverse members, the framework being coupled to a lower surface of the payload panel.

10. The payload assembly of claim 4, wherein the payload member further includes a primary payload component coupled to the payload panel, the primary payload component including at least one of a galley, a lavatory, a passenger seat, an attendant seat, a cargo container, a section partition, a fireplace, and an article of furniture.

11. The payload assembly of claim 4, wherein the payload member further includes at least one payload monument coupled to payload panel.

12. The payload assembly of claim 11, wherein the at least one payload monument includes a framework having one or more longitudinal members and one or more transverse members, the framework being coupled to an upper surface of the payload panel.

13. The payload assembly of claim 11, wherein the payload member further includes a primary payload component coupled to the at least one payload monument.

14. The payload assembly of claim 1, wherein the support structure comprises a floor assembly of a passenger cabin of an aircraft.

15. An assembly, comprising:
    a floor assembly including a plurality of elongated engagement members, the engagement members being spaced apart and approximately parallel, each engagement member including a top surface; and
    a payload assembly including:
        a payload member having a substantially flat portion positioned proximate the floor assembly, the substantially flat portion having a lateral edge that includes a recess;
    at least one payload support coupled to the substantially flat portion and spanning between an adjacent pair of elongated engagement members, the at least one payload support having first and second end portions coupled to the top surface of each of the adjacent pair of elongated engagement members, the first end portion of the payload support including an offset flat portion, the lateral edge of the substantially flat portion being substantially parallel with and adjacent to a corresponding one of the elongated supports such that the offset flat portion is fittingly engaged within the recess and is substantially co-planar with the substantially flat portion, the payload support being adapted to beam loads from the payload member to the adjacent pair of elongated engagement members, the at least one payload support being further adapted to be decoupled from the adjacent pair of elongated engagement members and moveable with the payload member relative to the floor assembly.

16. The assembly of claim 15, wherein the offset flat portion includes a plate member that is adapted to project over the top surface and operatively coupled thereto.

17. The assembly of claim 15, wherein the payload member includes a primary payload component coupled to the at least one payload support, the primary payload component including at least one of a galley, a lavatory, a passenger seat, an attendant seat, a cargo container, a section partition, a fireplace, a shelf, and an article of furniture.

18. The assembly of claim 15, wherein the payload member includes a payload panel coupled to the at least one payload support.

19. The assembly of claim 18, wherein the payload panel includes at least one recess disposed within a peripheral edge thereof, the at least one payload support having an upper portion that is fittingly engaged into the at least one recess.

20. The assembly of claim 18, wherein the at least one payload support is integrally-formed with the payload panel.

21. The assembly of claim 18, wherein the at least one payload support includes a framework having one or more longitudinal members and one or more transverse members, the framework being coupled to a lower surface of the payload panel.

22. The assembly of claim 18, wherein the payload member further includes a primary payload component coupled to the payload panel, the primary payload component including at least one of a galley, a lavatory, a passenger seat, a cargo container, a section partition, a fireplace, and an article of furniture.

23. The assembly of claim 18, wherein the payload member further includes at least one payload monument coupled to payload panel.

24. The assembly of claim 23, wherein the at least one payload monument includes a framework having one or more longitudinal members and one or more transverse members, the framework being coupled to an upper surface of the payload panel.

25. The assembly of claim 15, wherein the support structure comprises an airframe of an aircraft, and wherein the payload member comprises at least one of a galley, a lavatory, a passenger seat, an attendant seat, a cargo container, a section partition, a fireplace, a shelf, and an article of furniture.

26. An aircraft, comprising:
   a fuselage operatively coupled to an airframe;
   a propulsion system operatively coupled to the airframe;
   a floor assembly disposed within the fuselage and coupled to the airframe, the floor assembly including a plurality of elongated engagement members coupled to the airframe, the engagement members being spaced apart and approximately parallel, each engagement member including a top surface; and
   a payload assembly including
      a payload member having a substantially flat portion positioned proximate the floor assembly, the substantially flat portion having a lateral edge that includes a recess;
      at least one payload support coupled to the substantially flat portion and spanning between an adjacent pair of elongated engagement members, the at least one payload support having first and second end portions coupled to the top surface of each of the adjacent pair of elongated engagement members, the first end portion of the payload support including an offset flat portion, the lateral edge of the substantially flat portion being substantially parallel with and adjacent to a corresponding one of the elongated supports such that the offset flat portion is fittingly engaged within the recess and is substantially co-planar with the substantially flat portion, the payload support being adapted to beam loads from the payload member to the adjacent pair of elongated engagement members, the at least one payload support being further adapted to be decoupled from the adjacent pair of elongated engagement members and moveable with the payload member relative to the floor assembly.

27. The aircraft of claim 26, wherein the offset flat portion includes a plate member that is adapted to project over the top surface and operatively coupled thereto.

28. The aircraft of claim 26, wherein the payload member includes a payload panel coupled to the at least one payload support.

29. The aircraft of claim 28, wherein the payload panel includes at least one recess disposed within a peripheral edge thereof, the at least one payload support having an upper portion that is fittingly engaged into the at least one recess.

30. The aircraft of claim 28, wherein the at least one payload support includes a framework having one or more longitudinal members and one or more transverse members, the framework being coupled to a lower surface of the payload panel.

31. The aircraft of claim 28, wherein the payload member further includes a primary payload component coupled to the payload panel, the primary payload component including at least one of a galley, a lavatory, a passenger seat, an attendant seat, a cargo container, a section partition, a fireplace, and an article of furniture.

32. The aircraft of claim 28, wherein the payload member further includes at least one payload monument coupled to payload panel.

33. The aircraft of claim 28, wherein the at least one payload monument includes a framework having one or more longitudinal members and one or more transverse members, the framework being coupled to an upper surface of the payload panel.

34. A method of securing a payload to a support structure, comprising:
   coupling a plurality of elongated engagement members of a floor assembly to the support structure, the engagement members being spaced apart and approximately parallel, each engagement member including an engagement surface; and
   providing a payload assembly including a payload member that includes a substantially flat portion having a lateral edge that includes a recess, and a payload support coupled to the substantially flat portion, the payload support having first and second end portions and being adapted to span between an adjacent pair of engagement members;
   removably coupling the first and second end portions of the payload support with an upper surface of each of the adjacent pair of engagement members, wherein the first end portion of the payload support includes an offset flat portion, the lateral edge of the substantially flat portion being substantially parallel with and adjacent to a corresponding one of the elongated supports such that the removably coupling includes fittingly engaging the offset flat portion within the recess, the offset flat portion being substantially co-planar with the substantially flat portion; and
   at least partially transmitting loads from the payload member through the payload support to the adjacent pair of engagement members.

35. The method of claim 34, wherein providing a payload assembly including a payload member comprises providing a payload assembly having at least one of a galley, a lavatory, a passenger seat, a cargo container, a section partition, a fireplace, a shelf, and an article of furniture.

36. The method of claim 34, wherein providing a payload assembly comprises providing a payload assembly having a primary payload component operatively coupled to the at least one payload support, the primary payload component including at least one of a galley, a lavatory, a passenger seat, an attendant seat, a cargo container, a section partition, a fireplace, a shelf, and an article of furniture.

37. The method of claim 34, wherein providing a payload assembly comprises providing a payload assembly having a payload panel operatively coupled to the at least one payload support.

38. The method of claim 37, wherein providing a payload assembly having a payload panel comprised providing a payload assembly having at least one recess disposed within a peripheral edge of the payload panel, the at least one payload support having an upper portion that is operatively fittingly engaged into the at least one recess.

39. The method of claim 37, wherein providing a payload assembly including a payload support comprises providing a payload assembly having a framework including one or more longitudinal members and one or more transverse members, the framework being operatively coupled to a lower surface of the payload panel.

40. The method of claim 37, wherein providing a payload assembly further comprises providing a payload assembly having a framework having one or more longitudinal members and one or more transverse members, the framework being operatively coupled to an upper surface of the payload panel.

* * * * *